(12) United States Patent
Lee et al.

(10) Patent No.: US 12,079,761 B2
(45) Date of Patent: Sep. 3, 2024

(54) PROVIDING TEMPORARY VISIBILITY TO NON-AUTHORIZED USERS OF A RESTRICTED SYSTEM

(71) Applicant: Cox Communications, Inc., Atlanta, GA (US)

(72) Inventors: David Lee, Atlanta, GA (US); Jacob Mapel, Atlanta, GA (US); Hunter Shinn, Atlanta, GA (US); Zach Ritter, Atlanta, GA (US); Alexis Cohen, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 185 days.

(21) Appl. No.: 17/373,382

(22) Filed: Jul. 12, 2021

(65) Prior Publication Data
US 2023/0010898 A1    Jan. 12, 2023

(51) Int. Cl.
*G06Q 10/0833* (2023.01)
*G06F 16/953* (2019.01)
*H04L 9/40* (2022.01)

(52) U.S. Cl.
CPC ....... *G06Q 10/0833* (2013.01); *G06F 16/953* (2019.01); *H04L 63/108* (2013.01)

(58) Field of Classification Search
CPC .. G06Q 10/0833; G06F 16/953; H04L 63/108
See application file for complete search history.

(56) References Cited

U.S. PATENT DOCUMENTS

| 11,361,275 | B1* | 6/2022 | Lu | G06Q 10/0838 |
|---|---|---|---|---|
| 2015/0262123 | A1* | 9/2015 | Sharma | H04W 4/029 705/333 |
| 2015/0349917 | A1* | 12/2015 | Skaaksrud | G06Q 10/087 370/328 |
| 2017/0316370 | A1* | 11/2017 | Putcha | G06Q 10/083 |
| 2018/0060800 | A1* | 3/2018 | Robinson | G07C 9/00182 |
| 2021/0097486 | A1* | 4/2021 | Boccuccia | G06K 19/06028 |
| 2021/0256472 | A1* | 8/2021 | Javidan | H04W 4/025 |

OTHER PUBLICATIONS

AHM Shamsuzzoha, Logistics tracking: An implementation issue for delivery network, 2011, p. 1-3 (Year: 2011).*

* cited by examiner

*Primary Examiner* — Ibrahim N El-Bathy
(74) *Attorney, Agent, or Firm* — Eversheds Sutherland (US) LLP

(57) ABSTRACT

This disclosure describes systems, methods, and devices related to coordinating the exchange of information relating to the delivery of assets (e.g., packages, freight, supplies, parts, materials, raw goods, inventory, tools, and equipment) in a supply chain or inventor management context. A status token may be provided to an unauthorized user, wherein the status token is initialized in an invalid state. Attempts to query status information while the status token may be denied and/or convey no information regarding the status of the asset. If an adverse condition occurred during a designated time period, status information for the asset may be provided.

14 Claims, 8 Drawing Sheets

PROVIDING TEMPORARY VISIBILITY TO NON-AUTHORIZED USERS OF A RESTRICTED SYSTEM

TECHNICAL FIELD

This disclosure generally relates to systems and methods for providing temporary visibility access to non-authorized users of a restricted system. Techniques described herein may be used to provide temporary and permissioned access according to one or more conditions specified by an authorized user.

BACKGROUND

In the context of supply chain and inventory management, there may be many parties involved in the procurement, delivery, utilization, monitoring, handling, and disposal of assets, each with different informational needs. For example, authorized users of a supply chain or inventory management network may have full visibility into the location and status of key assets at all times, whereas unauthorized users have no visibility into location and status of high-value, critical, or important assets as they move through a supply chain or inventory management network. Due to the multi-party nature of supply chain management, however, there may be benefits to temporarily exposed visibility to involved parties of a supply chain or inventory management network, even where unauthorized users are involved. However, exposing more information than is necessary can present additional risks to the status or condition of high-value, critical, or important items in a supply chain or inventory management network.

Figure 1:
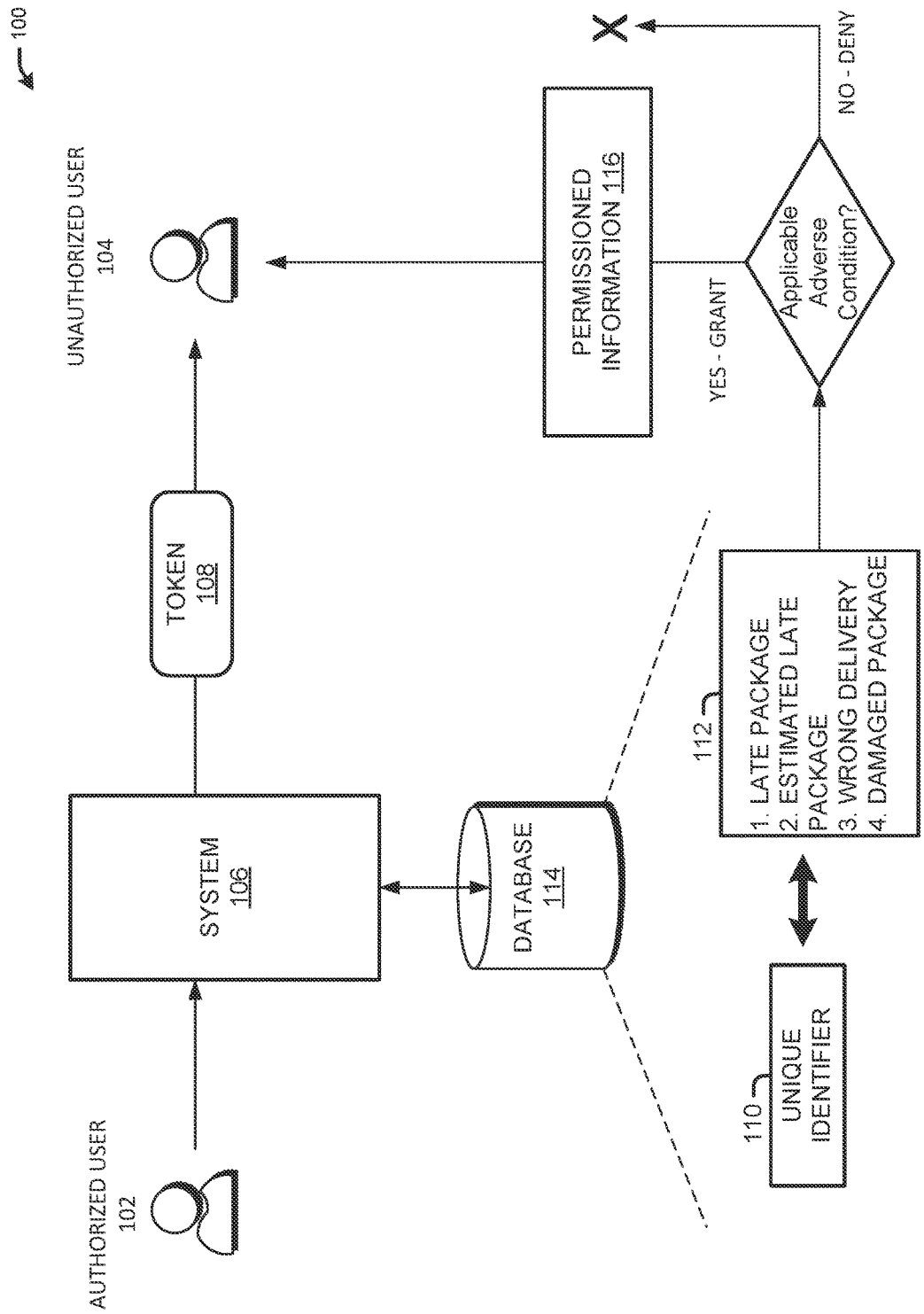
FIG. 1 illustrates an example environment in which permissioned status tokens are utilized, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

In the context of supply chain or inventory management, there may be a need to provide systems and methods for providing temporary visibility access to unauthorized users of a restricted system. An unauthorized user, as described herein, may refer to a computer system user or entity that is not associated with a set of permissions that grants the user or entity access to an organization's network. For example, an organization's supply chain or inventory management network may be managed internally, using a computer network, that stores status information for assets within the supply chain or inventory management network and can be queried by various authorized users. Authorized users may be users that are registered within the organization's computer network and are associated with security policies or permissions. Security policies or permissions may be evaluated to determine whether access to resources within a computer network should be granted or denied. In some cases, the absence of an affirmative grant of access results in the denial of access—this may be referred to as a deny-by-default security posture.

A tracking device may be an Internet-of-Things (IoT) embedded, attached, or co-located device that includes various sensors to collect metrics about the asset and its condition while it is in transit or at various stages from OEM to utilization to return, refurbishment, or disposal. Examples of sensors may include GNSS receivers (GPS or any other type used globally); temperature sensors; shock and impact sensors; clocks; and more. The tracking device may collect metrics at regular intervals specified by an authorized user and transmit the collected metrics to the organization's computer network. These metrics may be used to determine whether the asset is subject to an adverse condition and/or requires action to be taken. While "assets" are described throughout this disclosure in connection with various techniques, these techniques may be equally applicable to other types of items, such as packages, freight, supplies, parts, materials, raw goods, inventory, tools, and equipment. Each type of assets may be associated with different informational needs and may be associated with different adverse conditions.

In connection with the planning, movement, utilization, and disposal of an asset, an authorized user may manage the creation and distribution of a permissioned status token. A permissioned status token may refer to an electronic token that an unauthorized user may use to query status information, subject to permissions or conditions specified by the authorized user upon generation of the token. A permissioned status token may be initialized in an invalid state such that it is not usable by the unauthorized user unless one or more adverse conditions are applicable to the delivery of the asset. Possible adverse conditions are described in greater detail below—for example, if an asset is delayed or damaged, an adverse condition may apply. In some cases, an asset being delivered early may be considered an adverse condition—for example, the delivery of a high-value, critical, or important asset at a location prior to the arrival of a contractor may be an adverse condition in cases where nobody else is available to accept delivery of the high-value asset, prevent theft of the asset, etc.

An unauthorized user may submit a permissioned status token as part of a status request, which may be fulfilled or denied based on whether one or more conditions are applicable to the asset, such as an indication that the asset is damaged or delayed. In various embodiments, the unauthorized user lacks security policies or permissions that would otherwise allow the unauthorized user to query the status information via the organization's network. Fulfillment of the request may be contingent upon verifying that the unauthorized user is not located in an unauthorized country.

FIG. 1 illustrates an example environment 100 in which permissioned status tokens are utilized, in accordance with one or more embodiments of the present disclosure.

Authorized user 102 may refer to a user within a supply chain or inventory management network that has sufficient permissions to view, edit, or otherwise manage the status of various assets within a supply chain or inventory management network. Authorized user 102 may connect to an organization's computer network (e.g., via an intranet and/or Internet connection) and interact with various electronic-based supply chain or inventory management components such as servers, databases, embedded tracking devices, and so on. Such electronic-based components may be interconnected in any suitable manner, for example, through private networks (e.g., an organization's intranet), public networks (e.g., Internet), combinations thereof, and so the like. Authorized user 102 may be a manager within a supply chain or inventory management organization that tracks and manages the delivery of various high-value, critical, or important assets throughout the supply chain or inventory management network.

In various embodiments, authorized user 102 manages various aspects of a supply chain or inventory management network, such as ensuring delivery, maintenance, handling, or monitoring of assets in a supply chain or inventory management network. Authorized user 102 may coordinate the delivery of several assets in connection with each other. For example, authorized user 102 may schedule the delivery of several assets to a work site that include different components for a piece of infrastructure that are to be assembled and installed by a vendor at the work site. The assets may include different components for infrastructure that are housed (e.g., either at rest or temporarily) at different warehouses or stores that are located in different geolocations. Authorized user 102 may schedule, track, or otherwise manage delivery of these components to a worksite at or around a specific time (which may be referred to herein as an expected delivery time), schedule a vendor or contractor to be available at a worksite when the components are expected to arrive, and ensure the timely installation or maintenance of the assets. The vendor or contractor may receive delivery of multiple assets, assemble delivered components together to construct a unit of infrastructure, and perform a successful installation or maintenance of the infrastructure. Authorized user 102 may be responsible for managing the tracking and/or delivery of high-value, critical, or important items throughout a supply chain or inventory management network.

An organization may have a private intranet that employees of the organization may use to track the status of an asset as it moves through a supply chain or inventory management network. Employees within an organization may have their identities authenticated. For example, when an employee is onboarded in an organization, they may be required to provide various forms of identification that provide the organization with assurances of the user's identity. Employees may be subject to background checks or other means of identity verification to ensure that the employee can be trusted with sensitive information, such as the status of high-value, critical, or important assets as they move through a supply chain or inventory management network. Employees may also be vetted to ensure that they are trustworthy with sensitive information, and then provided credentials that the employee uses to access information, such as the status of assets as they move through a supply chain or inventory management network. Credentials may include, for example, a specific user name and password that are specific to an employee of the organization. For example, authorized user 102 may be a manager within the organization that is tasked with managing the delivery of various network infrastructure components to a worksite and coordinating the assembly of said components and installation of said network infrastructure by an outside vendor or contractor.

An unauthorized user 104 may refer to a user or entity within a supply chain or inventory management network that lacks policies or permissions that grant the unauthorized user 104 access to information within a supply chain or inventory management network. A vendor or contractor that is tasked with installation of network infrastructure may be an example of a type of unauthorized user 104. In some cases, the vendor or contractor may be an individual that is not an employee of an organization, and may not be subject to the same vetting and/or validation processes that employees are subject to. In this sense, an organization's level of trust to an unauthorized user may be lower than the organization's level of trust to an employee that has successfully been vetted. An organization may have sufficient reason to trust a vetted employee with sensitive information regarding the location and contents of high-value, critical, or important assets as they move through a supply chain or inventory management network, but not be able to trust vendors or contractors with the same level of access to such information. In some cases, an unauthorized user is a registered user, wherein his/her user account lacks sufficient security permissions/policies to access status information.

Furthermore, in various contexts, there are both technical and practical challenges involved in the registration of various third-parties (e.g., vendors or contractors) to an organization's computer network. One such challenge is scale—an organization may rely on a large number of vendors or contractors nationally or internationally, and there may be a large information technology (IT) burden to register such users. Another challenge is management—in various contexts, vendors or contractors may be hired on an as-needed or on-demand basis to perform individual jobs (e.g., install an infrastructure component); in some cases, these vendors or contractors are never re-enlisted by the organization to perform additional jobs, and registering such users within an organization's network would introduce excessive strain on IT administrators. Another challenge is that it may be infeasible to register such third-parties given the constraints of various supply chain or inventory management networks—for example, vendors may be enlisted to install infrastructure in an on-demand basis making it impossible to have credentials fully propagated throughout the organization's network. One such example of this challenge may be highlighted in an example where a piece of infrastructure is unexpectedly damaged (e.g., due to a storm) and a vendor or contractor is deployed to remove the damaged equipment and install replacement equipment that is delivered to the point of failure as quickly as possible—in such circumstances, requiring the vendor or contractor to undergo a thorough background check or vetting process and/or registering the vendor or contractor to the organization's network and waiting for permissions to propagate through the network may be impractical and/or impede the ability of the organization to repair the infrastructure. These challenges may be presented in any suitable combination with each other, depending on the specific use case. Accordingly, registering unauthorized user 104 within a computer network may be impractical or impossible, given the constraints within various use cases.

System 106 may refer to one or more computer systems within an organization's network that authorized user 102 utilizes to generate a permissioned status token. System 106 may include one or more computer systems connected to a network, such as an organization's private intranet. The system 106 may be connected to a public network as well as private network, with a firewall configured at ingress and egress points between the public and private networks. Authorized user 102 may have security policies and/or permissions that grant the authorized user the ability to generate permissioned status tokens. System 106 may be implemented using one or more electronic devices, such as a device described in connection with FIG. 7. System 106 may include memory that stores executable code that, when executed, causes one or more processors of system 106 to implement various features described herein, such as performing processes described in connection with FIGS. 6A-B.

In various embodiments, system 106 comprises executable instructions (e.g., in the form of a software executable or plugin) that, when executed, causes one or more processors of the system to generate one or more permissioned status tokens (e.g., permissioned status token 108). Permissioned status token 108 may refer to an electronic token that can be presented by a token-bearer (e.g., unauthorized user 104) to access status information, subject to certain conditions. Permissioned status token 108 may be initialized in an invalid state, such that if a token-bearer submits a status update request using a permissioned status token 108 immediately upon receiving it (e.g., while the permissioned status token 108 is in the invalid state), system 106 or another suitable response system conveys no information regarding the delivery status. For example, if a vendor or contractor attempts to use the permissioned status token 108 when it is in an invalid state to request status update information, the request may fail or otherwise convey no information about the status of the delivery.

In at least one embodiment, a permissioned status token 108 encodes a unique identifier 110, such as a globally unique identifier (GUID) or universally unique identifier (UUID). In some cases, the identifier may be generated based on a key of a key-value store that uniquely resolves to a particular asset. In some cases, at least a portion of the unique identifier is randomly generated. In some cases, the unique identifier can be deterministically generated at least in part, for example, by using a monotonically increasing integer that is incremented for each asset. Obfuscation techniques may be used to ensure that the unique identifier conveys no information regarding a particular asset. For example, if a monotonically increasing integer is used, it may be salted and hashed so that the integer value is not readily ascertainable by the token-bearer and the token-bearer is not able to infer any information regarding how many assets have been sent, nor generate tokens for other assets that it is not authorized to access. It should be noted that a "unique" identifier in this context may be unique in the sense that it uniquely identifies a particular asset.

The identifier 110 may be stored in association with a set of adverse conditions 112 that may be evaluated to determine whether permissioned status token 108 is active. An adverse condition may encode, for example, when delivery of an asset is later, determined based at least in part on an expected delivery time. As a second example, the current location of the asset (e.g., as determined by a tracking device associated to the asset), the current traffic conditions, and the expected delivery time may be used to determine whether an adverse condition corresponding to an estimated late delivery, which may arise from an unexpected road closure or freeway collapse. System 106 may use a database 114 such as a key-value database to store identifier 110 in association with the adverse conditions 112.

As part of a routine to generate permissioned status token 108, system 106 may allow authorized user 102 to define a set of conditions that define what state the permissioned status token 108 is in. For example, permissioned status token 108 may be initialized in an invalid state, but may transition to a valid state based on a determination that the delivery is late or will be late. This information—namely, that the delivery is or will be late—may be relevant to a vendor or contractor at a worksite and the vendor or contractor may use this information in various ways, such as to help schedule or delay subsequent tasks due to the delay. However, if the delivery is expected to be on-time, the permissioned status token 108 be in an invalid state and convey no information regarding the delivery status, if a request is submitted using the permissioned status token 108.

In various embodiments, authorized user 102 specifies a set of conditions for an asset's status. The set of conditions may be one or more adverse conditions that, if satisfied, will activate the permissioned status token 108 and allow status updates to be sent in response to delivery status update requests. For example, if the expected time has elapsed and an asset with infrastructure components has not yet been delivered to a worksite for a vendor or contractor to assemble and install, the vendor or contractor may be able to query the status of the delivery using permissioned status token 108. A permissioned status token 108 may be active only for a temporary duration, or subject to certain criteria. For example, a tracking device may be associated to an asset and the geolocation of the tracking device in conjunction with real-time traffic conditions may be used to determine an estimated delivery time for the asset. A bridge closure or freeway collapse may cause the delivery of the asset to be delayed such that the estimated delivery time is later than the expected delivery time for the asset. In such a scenario, permissioned status token 108 may become active until the asset is delivered. However, if the bridge closure or freeway collapse is quickly resolved or mitigated, then the estimated delivery time may be dynamically updated so that it indicates the asset is no longer expected to be delivered late, and the permissioned status token 108 may transition back to an invalid state. In some cases, an asset being delivered early may be considered an adverse condition—for example, the delivery of a high-value, critical, or important asset at a location prior to the expected delivery time may be an adverse condition in cases where nobody is available to accept delivery of the high-value asset, prevent theft of the high-value asset, etc.

There are various adverse conditions that may be specified by authorized user 102. For example, one adverse condition, which may be referred to as a late asset, may correspond to a condition in which the expected delivery time has passed and the asset's location is not at the expected delivery location. The expected delivery time may be determined by a clock of system 106 and the asset's real-time location may be determined based on metrics that are collected by a tracking device associated to the asset.

A second example of an adverse condition, which may be referred to as an estimated late asset, may correspond to a condition in which the current time is earlier than the expected delivery time, but that the estimated delivery time is later than the expected delivery time. This adverse condition may arise under various scenarios—for example, bad traffic at a bottleneck (e.g., a bridge closure or freeway collapse) may result in worse-than-expected traffic patterns arising after a truck has been deployed to make a series of deliveries. This may result in a cascade of several late deliveries. As a second example, a delivery may be delayed due to equipment being delayed at a warehouse facility such that the equipment is put on a truck at such time and estimated traffic conditions indicate that it is estimated to arrive after the time that it is expected. It should be noted that estimated late deliveries may be a prospective prediction that a late delivery (e.g., first adverse condition described above) will occur, but that changes to traffic or weather conditions may change such prediction so that the adverse condition may be withdrawn based on dynamic changes to real-world conditions.

A third example of an adverse condition, which may be referred to as a wrong delivery, may correspond to a condition in which the asset status has been updated to being delivered (rather than in progress) but the tracking device for the asset emits geolocation information different from the expected delivery location. The expected delivery location may have a suitable radius so that the delivery of the asset may be made anywhere at or near a worksite, but it may be the case that an asset is delivered to a different worksite than the expected worksite by accident. In such cases, an adverse condition may arise, and the status of the asset may be shared with the vendor or contractor. In some cases, the vendor or contractor may have the option to retrieve the asset from the other worksite. The permissioned status token 108 may be used to provide authentication and/or authorization with temporary and limited permission to enter the other worksite and only to retrieve the asset.

A fourth example of an adverse condition, which may be referred to as a damaged or compromised asset, may correspond to a condition in which sensor data of a tracking device associated to the asset indicates that the asset has been damaged or may be damaged in transit. For example, a temperature sensor may be associated to assets with temperature-sensitive components that may be damaged if the temperature of the asset diverges from a pre-determined temperature range (too hot or too cold). Temperature sensors on tracking devices may provide metrics to system 106 that are used to determine whether the temperature exceeds a certain upper or lower limit for a specified duration of time. Different equipment may have different heat or cold tolerances and may be able to tolerate certain heat tolerances for different durations of time. These may be defined based on the specific contents of the assets. Another example of sensor-based metric that can be collected from tracking device is a shock or force sensors that can be used to determine whether components may have been subject to excess force while in transit. For example, glass-based components, pliable sheets of metal, etc. may be damaged in transit if subject to excess forces. In some cases, system 106 collects metrics related to the amount of force or shock that an asset has been subject to, and if the asset has been subject to excess force, the contractor or vendor may use permissioned status token 108 to receive status updates for the asset. The status update, in this illustrative example, may indicate that the component was potentially damaged and instruct the contractor or vendor to inspect the component upon arrival, repair the component, or perform other suitable actions in response to the provided status information.

In general, permissioned status token 108 may be implemented using at least three components—first, a unique identifier; second, a finite-state machine (FSM) wherein states of the FSM represent different states that the permissioned status token 108 and directed edges represent conditions that cause the permissioned status token 108 to transition from one state to another; and third, permissioned information that may be revealed at respective states of the FSM. It should be noted that some states of the FSM may correspond to no information being made available. In various embodiments, an initial state of the FSM corresponds to an invalid state and the invalid state conveys no status information regarding the delivery.

Authorized user 102 may configure system 106 to generate a permissioned status token 108 when an asset delivery is scheduled. Permissioned status token 108 may be provided to unauthorized user 104 when the delivery is scheduled, for example, in the form of a HTTP-based weblink. Permissioned status token 108 may be sent over email, text message, or any other suitable manner. In some embodiments, system 106 proactively generates notifications to pre-delegated users (authorized or unauthorized) related to an asset when an adverse condition results in the generation of a permissioned status token 108. For example, a designated contractor responsible for maintenance on a particular day may be notified of the adverse condition that caused permissioned status token 108 to be generated.

In various embodiments, unauthorized user 104 receives permissioned status token 108 and is able to click on a HTTP-based weblink to submit a request to system 106 for updated status on a delivery. A status update does not necessarily imply that the unauthorized user has any previous status information regarding the delivery. In any case, in one embodiment, unauthorized user 104 submits a status update request to system 106. System 106 may determine whether an applicable adverse condition applies. In some embodiments, system 106 evaluates a finite-state machine to determine a current state of the delivery, which may be evaluated based at least in part on metrics collected from a tracking device including some or all of: geolocation; temperature; force or shock experienced; time the metric was collected; and so on. In some embodiments, unauthorized user 104 is able to share permissioned status token 108 with other entities to allow another unauthorized user to request and receive status update information by presenting permissioned status token 108.

If the system determines that permissioned status token 108 is in an invalid state, an appropriate response to a status update request may be furnished. For example, the response may be the same as if the asset did not exist. In some cases, it could provide a reason for the access denial or no response at all could be provided.

However, if the system determines that an adverse condition exists or, more generally, that status information should be provided, system 106 may determine appropriate permissioned information 116 to provide as specified by authorized user 102 when permissioned status token 108 was generate and generate a response with such information. For example, the response may provide the vendor with an updated delivery time based on the most recent geolocation metric of the tracking device and current traffic conditions, but without divulging the current or historical geolocation of the tracking device. It may be important to hide this information from the vendor or contractor, for example, so that the vendor or contractor is not made privy to the warehouse location where certain high-value, critical, or important assets are stored.

In at least one embodiment, permissioned status token 108 is received as part of a request for an asset status. The permissioned status token 108 may encode or otherwise be used to determine identifier 110. Database 114 may be queried using identifier 110 to determine adverse conditions 112. Adverse conditions 112 may be evaluated to determine whether any of the adverse conditions are applicable. If an adverse condition is applicable, permissioned information 116 may be determined. Permissioned information 116 may refer to information that is provided in a response to a status update request. Permissioned information 116 may include information that an unauthorized user would not be able to otherwise access without presenting permissioned status token 108. Permissioned information 116 may include an estimated delivery time of an asset (e.g., indicating that the asset will arrive later than the expected delivery time), an indication of the current location of the asset, an updated delivery location, instructions to inspect the asset for damage, combinations thereof, and more. However, if no adverse conditions are applicable, a request for delivery status information by the unauthorized user 104 may be denied.

Figure 2:
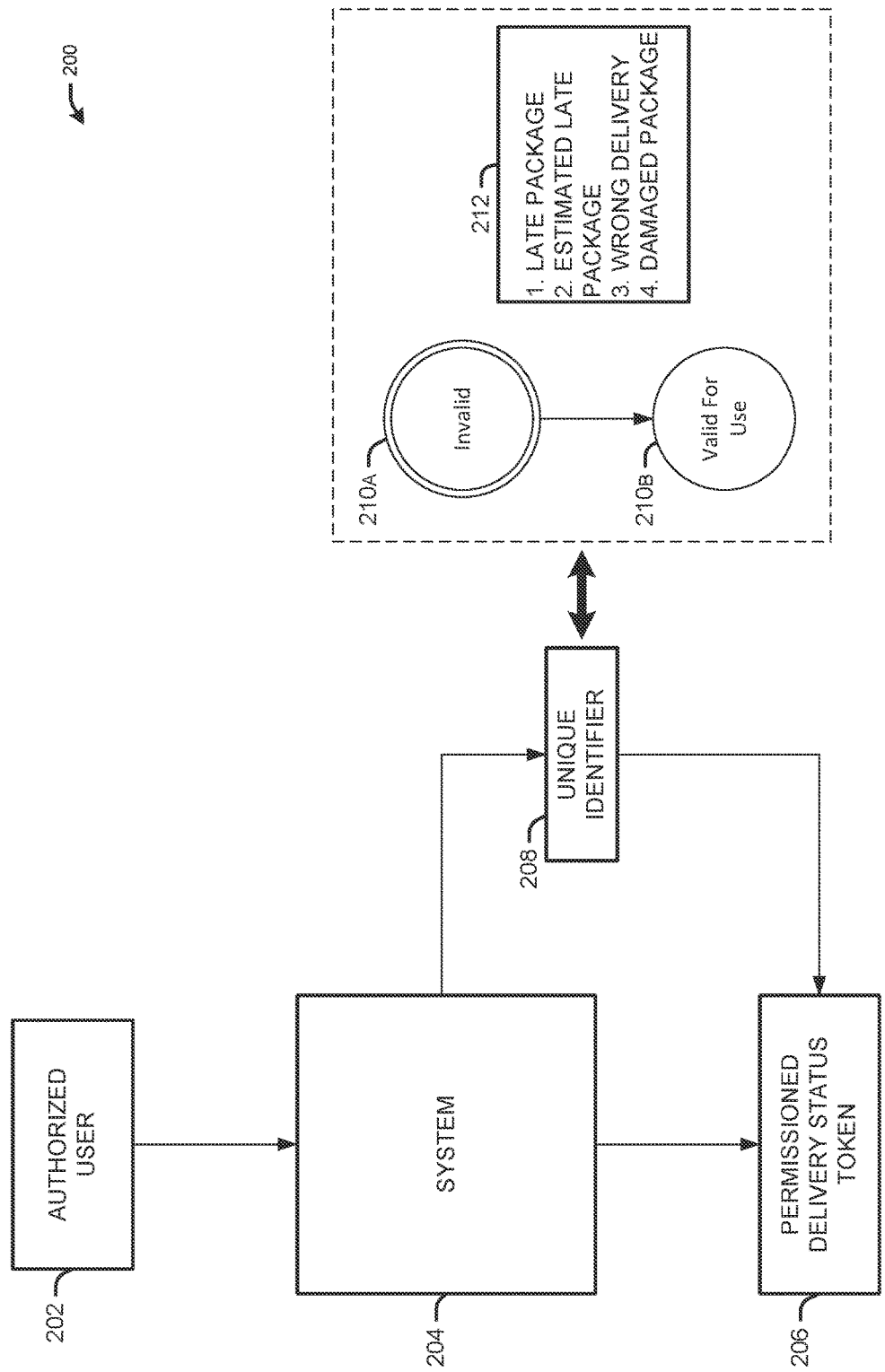
FIG. 2 illustrates an example environment in which an authorized user configures the generation of a permissioned status token, in accordance with one or more embodiments of the present disclosure.

FIG. 2 illustrates an example environment 200 in which an authorized user configures the generation of a permissioned status token, in accordance with one or more embodiments of the present disclosure.

Authorized user 202 may refer to a computing entity used by a manager or other authorized user of an organization. Authorized user 202 may use a GUI-based dashboard or console to generate a permissioned status token 206. Various aspects of permissioned status token 206 may be specified through a graphical interface, such as various conditions and permissioned information, which may be customized based on use case.

In various embodiments, generating a permissioned status token comprises generating, creating, or otherwise determining a unique identifier. In some cases, the authorized user 202 is not required to generate a unique identifier and one is automatically generated by system 204 when permissioned status token 206 is created. A unique identifier 208 may be a globally unique identifier (GUID) or universally unique identifier (UUID). In some cases, the identifier may be generated based on a key of a key-value store that uniquely resolves to a particular asset. In some cases, at least a portion of the unique identifier is randomly generated. In some cases, the unique identifier can be deterministically generated at least in part, for example, by using a monotonically increasing integer that is incremented for each asset. Obfuscation techniques may be used to ensure that the unique identifier conveys no information regarding a particular asset. For example, if a monotonically increasing integer is used, it may be salted and hashed so that the integer value is not readily ascertainable by the token-bearer and the token-bearer is not able to infer any information regarding how many assets have been sent, nor generate tokens for other assets that it is not authorized to access. It should be noted that a "unique" identifier in this context may be unique in the sense that it uniquely identifies a particular asset.

In various embodiments, authorized user 202 specifies various states (e.g., states 210A and 210B) for the permissioned status token 206. For example, the permissioned status token 206 may be allowed to be in a valid or invalid state. Other states may be possible as well. Among the available states, a single state may be specified as an initial state. In various embodiments, the invalid state is specified as the initial state such that permissioned status token 206 is not initially usable. In some embodiments, the states are predefined as valid and invalid, and do not need to be explicitly selected by authorized user 202 in a GUI dashboard or console. In some embodiments, a count-down or boundary may be surfaced to the unauthorized user to provide more context into when a token will be active. For example, if an expected delivery time for an asset is 9:00 AM, then count-down or alert may be surfaced to the bearer of the (inactive) token at 8:55 AM indicating that the token will be activated at 9:00 AM if the asset is not delivered by then.

Authorized user 202 may specify one or more conditions such as adverse conditions 212 illustrated in FIG. 2. A condition may refer to an adverse condition. The conditions may be used to define when a permissioned status token 206 transitions from an invalid state to a valid state. For example, permissioned status token 206 may be initialized to an invalid state such that an unauthorized user is not able to query any information using the token until an adverse condition is met. One such example is where a vendor or contractor is expecting a component to be delivered to a worksite at an expected time, but the estimated delivery time is delayed—for example, due to unexpectedly bad traffic. In some embodiments, the unauthorized user receives a notification (e.g., via email or text message) when a permissioned status token 206 is activated and may be used to query information regarding delivery.

States and conditions as described above may be implemented more generally as a finite-state machine (FSM). In at least one embodiment, states of the FSM correspond to different permissioned information that can be made available in response to a status update request (e.g., including a state that correspond to no information) and directed edges correspond to conditions—for example, adverse conditions, that, if met, trigger the transition from one state to another. The FSM may have an initial state, which may be indicated in FIG. 2 as by the double circle around state 210A.

System 204 may store unique identifier 208 in association with additional information such as states 210 and conditions 212 that can be used to determine how delivery status requests should be processed. In some embodiments, system 204 stores a key-value pair for each delivery wherein unique identifier 208 is the key and the value is the information (e.g., states 210 and conditions; a FSM) that indicates how a status update request should be processed.

A permissioned status token 206 may be used to coordinate the delivery of one or more assets to an unauthorized user at a location. The unauthorized user may be a vendor or contractor that is not authorized to access an organization's network and may lack a user account with security policies or permissions to query delivery status information.

Figure 3:
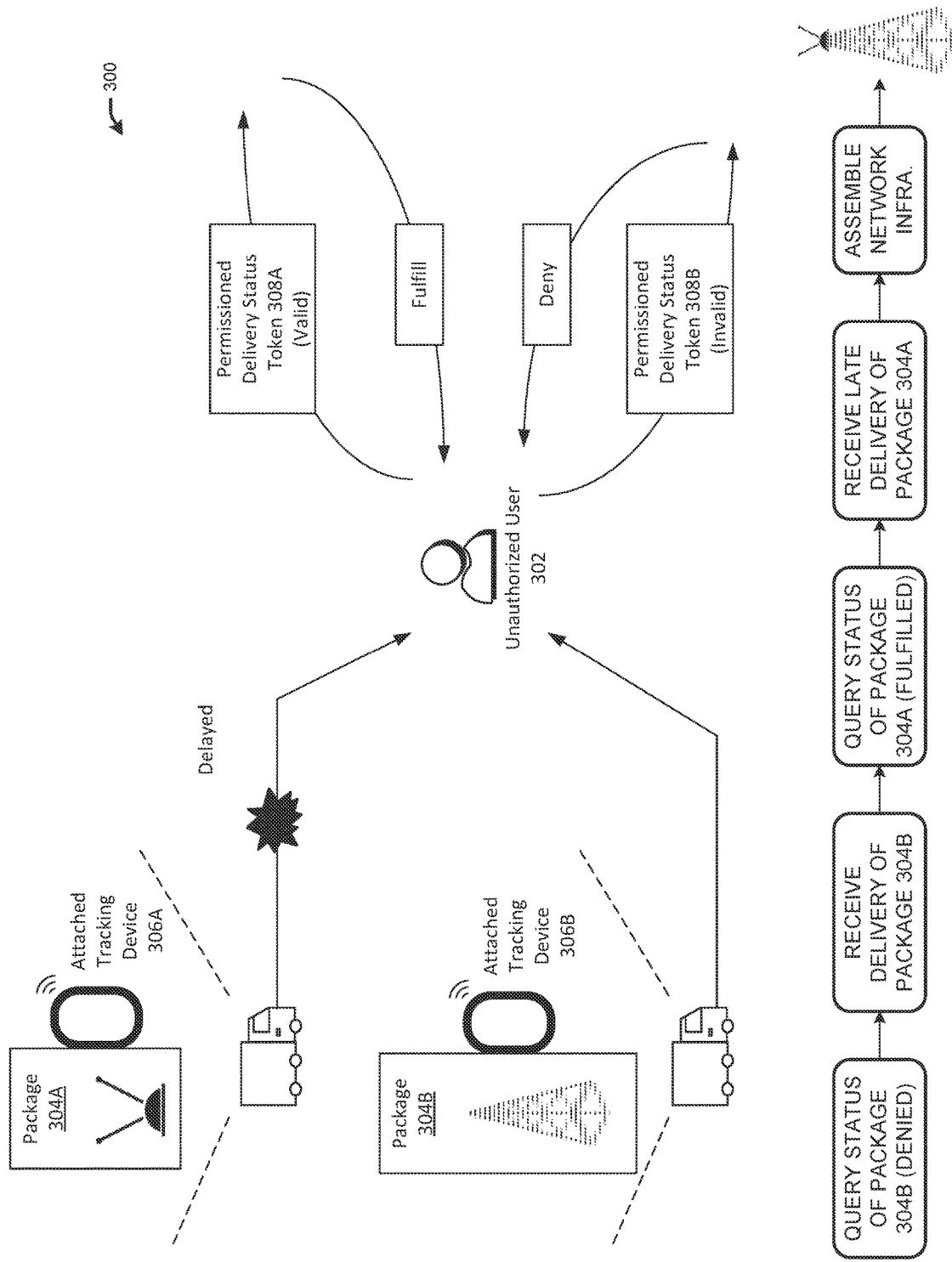
FIG. 3 illustrates an example environment in which a permissioned status token may be utilized, in accordance with one or more embodiments of the present disclosure.

FIG. 3 illustrates an example environment 300 in which a permissioned status token may be utilized, in accordance with one or more embodiments of the present disclosure.

An unauthorized user 302 may be a vendor or contractor that is tasked with receipt of one or more assets at a worksite. For example, infrastructure components may be separately shipped to the worksite, where the unauthorized user 302 is to assemble the components together and install the infrastructure equipment.

An organization may task unauthorized user 302 with receipt of assets 304A and 304B. In various embodiments, embedded tracking devices 306A and 306B are associated with assets 304A and 304B. A tracking device may collect metrics of an asset in motion. The tracking device may include various hardware sensors, such as a GNSS receiver; temperature sensor; shock and impact sensors; and more. Sensors may be used to collect various metrics relating to an asset. The metrics may be collected by the tracking device and transmitted via a suitable communications channel. The tracking device may leverage wireless communications receivers and transmitters. A tracking device may communicate with an organization's network via a suitable wireless communications channel. Tracking device may be used to provide information regarding the location of the assets in motion, temperature readings, shock or impact measurements, and so on. Tracking devices may vary in size, dimensions, and capabilities.

As depicted in FIG. 3, two assets 304A and 304B may be sent to unauthorized user 302. The assets may have respective permissioned status tokens 308A and 308B. The permissioned status tokens illustrated in FIG. 3 may be generated in accordance with techniques described elsewhere in this disclosure, such as those discussed in connection with FIG. 2. In some cases, the same type of token is generated for both 308A and 308B. In some cases, different types of tokens (e.g., tokens activated based on different sets of conditions) may be generated.

In various embodiments, an authorized user (e.g., employee or manager of an organization) schedules the delivery of assets 304A and 304B. As part of scheduling of the delivery, tracking devices 306A and 306B may be provisioned and associated with assets 304A and 304B to track the movement of the assets. The provisioning may include specifying parameters as to which metrics should be collected, frequency of such metrics, and the like. The provisioning may also specify when to start tracking the asset (e.g., when the asset is expected to leave a warehouse).

In various embodiment, authorized user generates permissioned status tokens 308A and 308B either as part of or separate from scheduling the delivery of assets 304A and 304B. Permissioned status token may be generated as a HTTP-based weblink that encodes a uniform resource identifier (URI), which may be the unique identifier or encode the unique identifier associated with the asset being delivered. The permissioned status tokens 308A and 308B may be sent via a text message or email to unauthorized user. In some embodiments, unauthorized user 302 can simply click on a weblink for a permissioned status token to submit a status update request for an asset.

Permissioned status tokens 308A and 308B may behave differently, based on the status of the assets. Consider an example in which assets 304A and 304B include components that are being delivered to a worksite where unauthorized user 302 is to assemble the components and install equipment. In this example, the assets may have the same expected delivery time; the assets may be shipped from different warehouses, where such components are typically housed, so that the delivery of both components is expected to be at or around the same time (e.g., the expected delivery time). Tracking devices 306A and 306B may track the progress of such deliveries, for example, by collecting geolocation metrics of the assets 304A and 304B as they are being delivered. If, geolocation metrics of asset 304A and current traffic conditions indicate that the asset is estimated to have a late delivery, permissioned status tokens 308A may become active and unauthorized user 302 will be able to query the status of asset 302A using permissioned status tokens 308A. Conversely, continuing with the example, asset 304B may be delivered on a different route that is not adversely impacted, and permissioned status tokens 308B may be invalid and not usable to query status information, since it is expected to arrive on schedule.

While devices 306A and 306B illustrated in FIG. 3 may be used to collect metrics associated with assets (e.g., packages) many other mechanisms for collecting metrics are contemplated within the scope of this disclosure. For example, computer vision techniques may be used to determine the location and/or condition of an asset when it arrives at a warehouse or facility. A camera or other visual capture device may be used to monitor a location, detect that a particular asset was dropped off or transited through the location, and determine one or more metrics for the asset based on a captured video feed. Captured metrics may include when the asset was dropped off or passed through a location, whether there are any visible deformations to the asset (e.g., if the asset is in a generally rectangular box, any dents, distortions, or tears may indicate that the asset was damaged and may not be suitable for use). An asset may have a shipping label, quick response (QR) code, or other identifying mark that is outwardly visible such that it may be captured by a video feed and then used to identify the asset (e.g., in the case where multiple assets are expected at the same location). In some cases, metrics may be manually submitted (e.g., by an employee or individual that receives delivery of an asset).

Figure 4:
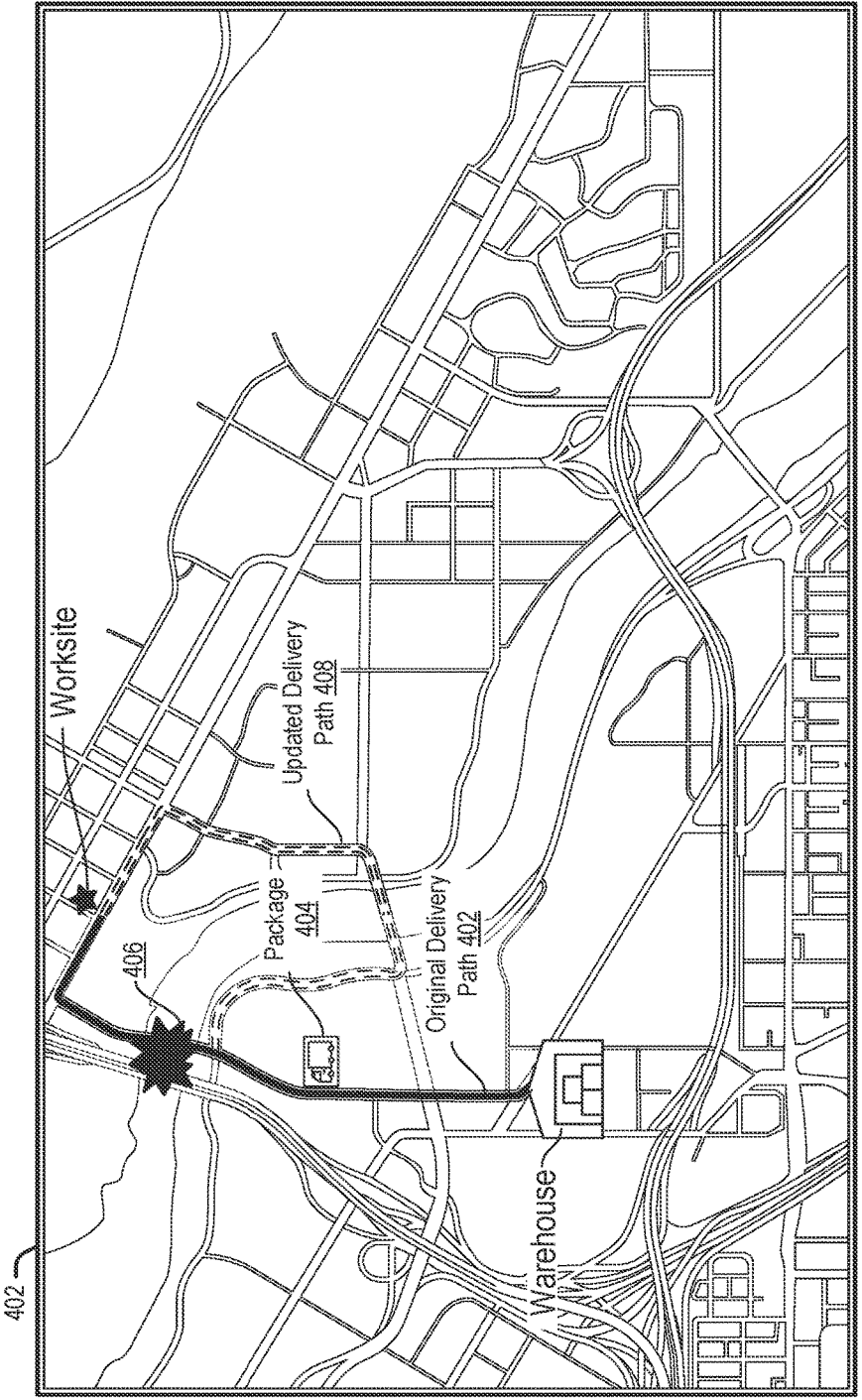
FIG. 4 illustrates an example environment in which a permissioned status token may be utilized based on an adverse condition, in accordance with one or more embodiments of the present disclosure.
Figure 4:

FIG. 4 illustrates an example environment 400 in which a permissioned status token may be utilized based on an adverse condition, in accordance with one or more embodiments of the present disclosure.

In at least one embodiment, environment 400 depicts a map and a delivery path 402 for an asset 404 that is in transit. The asset may have an associated tracking device that emits metrics as to the location of the asset and/or other metrics. The asset may be shipped such that, under expected delivery conditions, that the asset will arrive by an expected delivery time.

As an illustrative example, while asset 404 is in transit, an unexpected traffic condition such as a bridge closure may occur. This may be depicted as graphic 406 in FIG. 4. A system receiving metrics from the tracking device of asset 404 may determine the current GNSS coordinates of the asset and an updated path for delivery of the asset. An estimated delivery time may be calculated based on the updated delivery path 408. If the estimated delivery time of the new path is later than the expected delivery time or is a certain amount of time later (e.g., more than 15 minutes late), then a permissioned status token for the asset 404 may transition from an invalid state to a valid state that allows it to be used. This transition may be based on the detection of an estimated late delivery, an illustrative example of one type of adverse condition that may trigger a permissioned status token to become active and valid for use.

Figure 5:
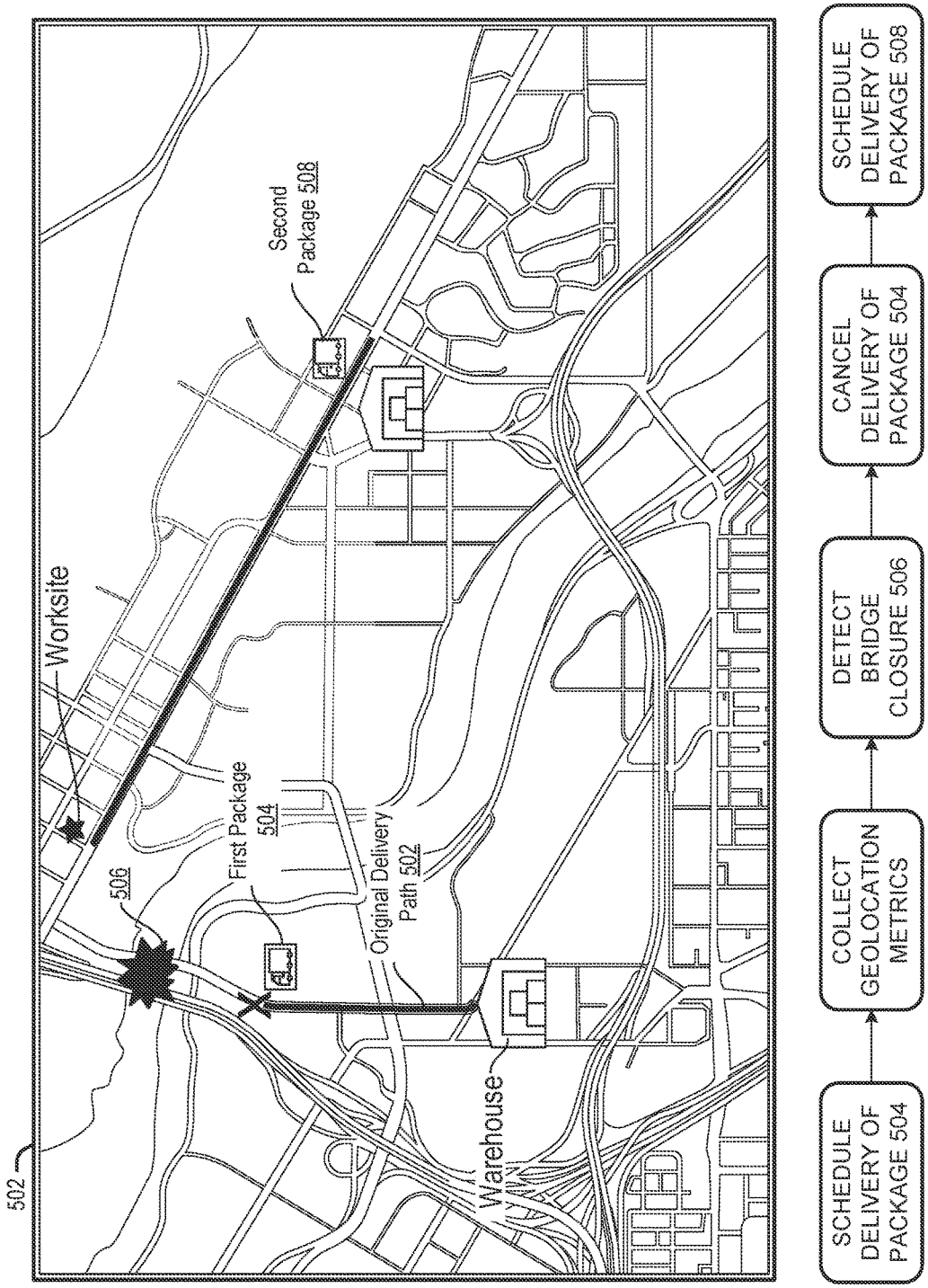
FIG. 5 illustrates an example environment in which a permissioned status token may be utilized based on an adverse condition, in accordance with one or more embodiments of the present disclosure.

FIG. 5 illustrates an example environment 500 in which a permissioned status token may be utilized based on an adverse condition, in accordance with one or more embodiments of the present disclosure.

In at least one embodiment, environment 500 depicts a map 502 and a delivery path for an asset 504 that is in transit. The asset may have an associated tracking device that emits metrics as to the location of the asset and/or other metrics.

The asset may be shipped such that, under expected delivery conditions, that the asset will arrive by an expected delivery time.

As an illustrative example, while asset 504 is in transit, an unexpected traffic condition such as a bridge closure may occur. This may be depicted as graphic 506 in FIG. 5. A system receiving metrics from the tracking device of asset 504 may determine the current GNSS coordinates of the asset and an updated path for delivery of the asset. An estimated delivery time may be calculated based on the updated path. If the estimated delivery time of the new path is later than the expected delivery time, mitigations or alternative delivery strategies may be considered. For example, if the system determines that another warehouse also includes the same contents as the asset (e.g., same SKU or model), then a replacement delivery may be scheduled from the other warehouse with a second asset 508 that is comparable to asset 504. Delivery of the original asset 504 may be canceled.

Figure 6A:
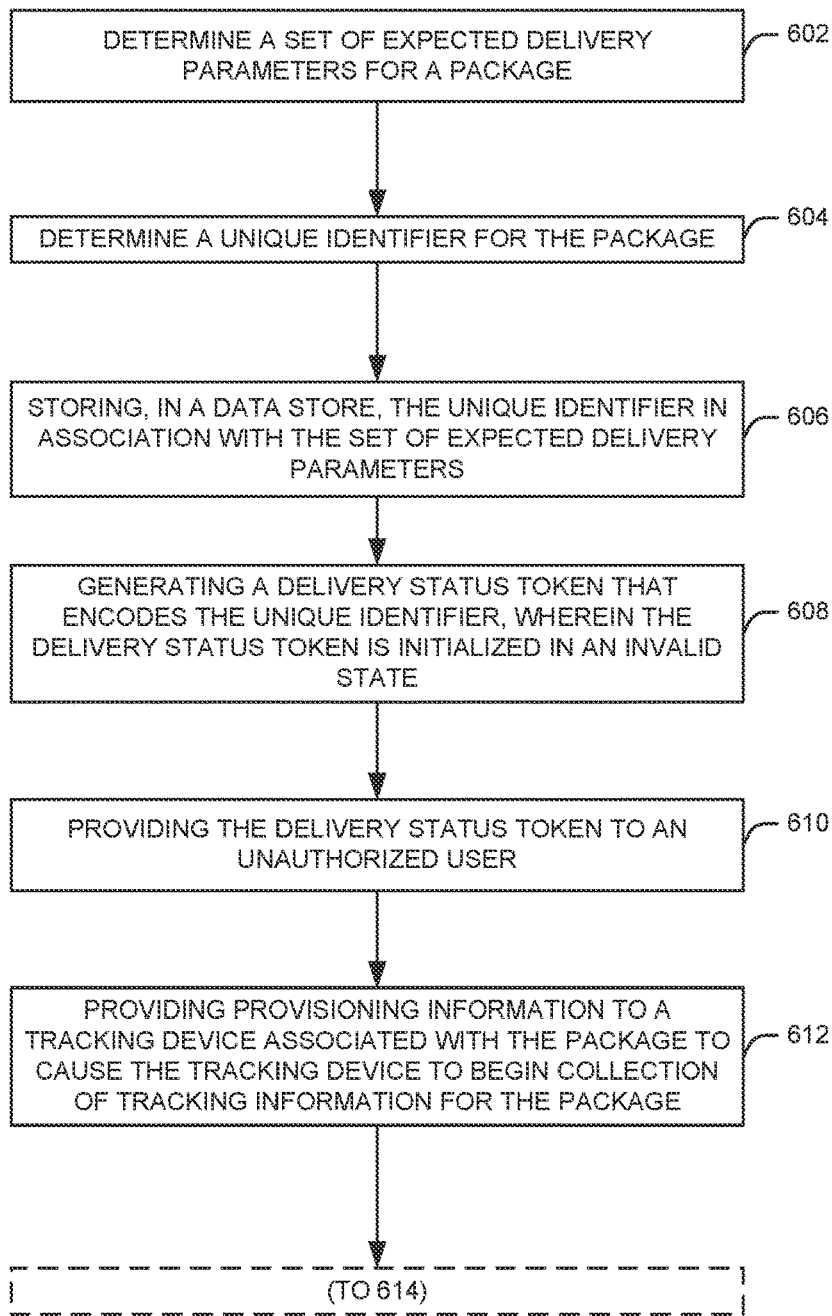
FIGS. 6A-6B show an illustrative example of a process for utilizing a status token, in accordance with one or more example embodiments of the present disclosure.
Figure 6B:
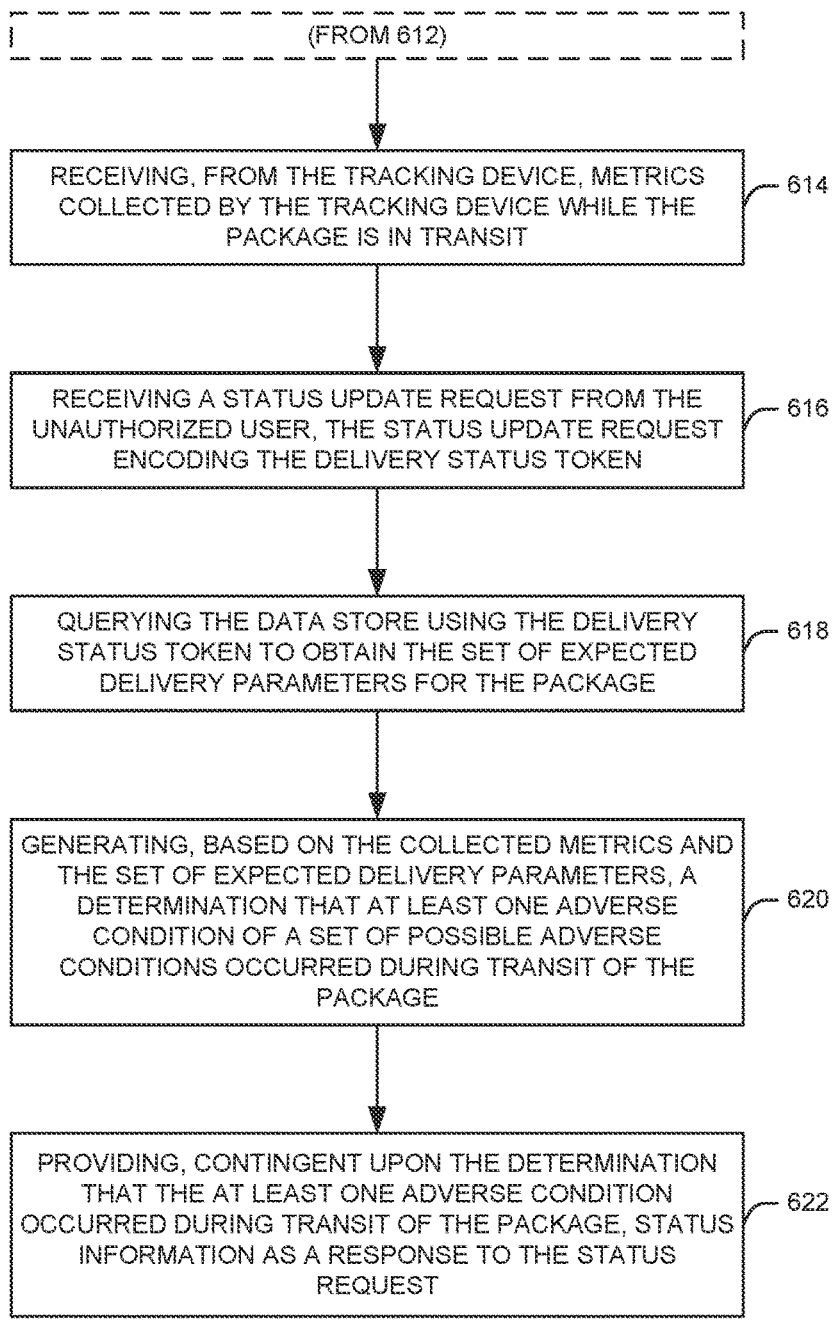

FIGS. 6A-B shows an illustrative example of a process 600 for utilizing a status token, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1 and 7. In at least one embodiment, process 600 or a portion thereof is implemented by one or more computer systems that manage a supply chain or inventory management network. Process 600 may be implemented at least in part using any suitable system, such as those described in connection with FIG. 1 and FIG. 2.

In at least embodiment, process 600 comprises determining 602 a set of expected parameters for an asset, wherein the set of expected parameters comprises one or more of: an expected location; an expected delivery time; an expected temperature range or temperature conditions; an expected pressure level or range; an expected humidity level or range; shock or force parameters; description of contents of the asset, which may include the uses for the asset; one or more associated assets (e.g., assets that are to be assembled together as a cohesive unit); acceptable condition of the asset (e.g., asset is not subjected to excess heat, cold, humidity, shock, etc.); metadata associated with a route, status, or condition of the asset; or any suitable combination thereof. The expected delivery time may be based on an estimate of how long it takes for the asset to be delivered from its current location (e.g., a warehouse) to a destination, such as a worksite.

In at least one embodiment, process 600 comprises determining 604 a unique identifier for the asset. The unique identifier may be a globally unique identifier (GUID) or universally unique identifier (UUID). In some cases, the identifier may be generated based on a key of a key-value store that uniquely associates to an asset. In some cases, at least a portion of the unique identifier is randomly generated. In some cases, the unique identifier can be deterministically generated at least in part, for example, by using a monotonically increasing integer that is incremented for each asset. Obfuscation techniques may be used to ensure that the unique identifier conveys no information regarding a particular asset. For example, if a monotonically increasing integer is used, it may be salted and hashed so that the integer value is not readily ascertainable by the token-bearer and the token-bearer is not able to infer any information regarding how many assets have been sent, nor generate tokens for other assets that it is not authorized to access. It should be noted that a "unique" identifier in this context may be unique in the sense that it uniquely identifies a particular asset.

In at least some embodiments, process 600 comprises storing 606, in a data store, the unique identifier in association with the set of expected parameters. The data store may be a database. The unique identifier may be stored in a key-value database where the unique identifier is a key of a key-value pair and the value of the key-value pair encodes information usable to determine how to process a status update request. The set of expected parameters may be used to determine whether one or more possible adverse conditions are applicable to asset. The value of a key-value pair may, for example, include a set of adverse conditions that may be evaluated to determine whether an invalid token should be activated. In some embodiments, the value of a key-value pair is a finite-state machine (FSM) that encodes how status update requests should be processed and/or what information may be provided to an unauthorized user that requests status update information.

In at least some embodiments, process 600 comprises generating 608 a status token that encodes the unique identifier, wherein the status token is initialized in an invalid state. The status token may be a permissioned status token, such as those described above. The status token may comprise a uniform resource identifier (URI) that can be used to submit a status update request to the system to request information about the status of the asset associated with the unique identifier.

In at least some embodiments, process 600 comprises providing 610 the status token to an unauthorized user. A status token may be provided to an unauthorized user via a text message, instant message, email, etc. In general, any suitable electronic messaging system may be used to transmit the status token to an unauthorized user. In some embodiments, unauthorized user receives a text messages with a weblink that submits a status update request to system.

In at least some embodiments, process 600 comprises providing 612 provisioning information to a tracking device associated with the asset to cause the tracking device to begin collecting tracking information for the asset. In at least some embodiments, a tracking device is associated to an asset as part of the scheduling of the delivery of the asset. For example, the tracking device may be placed within a container or attached to the side of an asset. The tracking device may be an embedded Internet-of-Things (IoT) device. A tracking device may collect metrics of an asset in motion. The tracking device may include various hardware sensors, such as a GNSS receiver; temperature sensor; shock and impact sensors; and more. Sensors may be used to collect various metrics relating to the asset. The metrics may be collected by the tracking device and transmitted to an organization's network via a suitable wireless communications channel. The tracking device may utilize wireless communications receivers and transmitters. A tracking device may communicate with an organization's network via a suitable communications channel. Tracking devices may be used to provide information regarding the location of the assets in transit, temperature readings, shock, or impact measurements, and so on. Tracking devices may vary in size, dimensions, and capabilities.

In at least some embodiments, process 600 comprises receiving 614, from the tracking device, metrics collected by the tracking device while the asset is in motion. A tracking device associated to an asset may use a wireless network (e.g., cellular network) to transmit metrics to a system performing at least part of process 600. In various embodiments, metrics are collected periodically, for example, every five minutes. The metrics may be collected according to a schedule specified by an authorized user. Tracking device may comprise a GNSS receiver that collects GNSS coordinates of the asset in motion, and this geolocation information may be transmitted to the system along with timestamps, providing snapshots of the asset as it is being physically delivered.

In at least one embodiment, process 600 comprises receiving 616 a status update request from the unauthorized user, the status update request encoding the status token. The status update request may be submitted using information included in a permissioned status token provided to the unauthorized user. For example, the permissioned delivery status may encode information usable to determine a unique identifier. If a status update request is received while the status token is in an invalid state (e.g., no potential adverse conditions are applicable) then the status update request may be denied or otherwise treated in the same manner as if the delivery of the asset did not exist. In such cases, based on determining that none of the set of possible adverse conditions are applicable, the system may deny fulfillment of the second status update request.

In at least some embodiments, process 600 comprises querying 618 the data store using the status token to obtain the set of expected parameters for the asset. The data store may be a key-value database. System performing at least part of process 600 may extract a unique identifier from the status request (e.g., from the status token) and obtain information usable to determine how to process the delivery status request. Information usable to determine how to process the delivery status request may comprise a set of adverse conditions that, if evaluated to be true, cause the status token to transition from an invalid state to a valid state. The set of expected parameters may be encoded as part of logic to determine whether one or more adverse conditions are applicable to the asset.

In at least some embodiments, process 600 comprises generating 620 based on the collected metrics and the set of expected parameters, a determination that at least one adverse condition of a set of possible adverse conditions occurred in the designated period of time to the asset. The set of possible adverse conditions may include one or more of the following: a first possible adverse condition, that the asset is not at the expected location and that the expected time has elapsed; a second possible adverse condition, based on the geolocation metrics of the tracking device at the first time, that an estimated delivery time for the asset is after the expected delivery time; a third possible adverse condition, that the asset is in a location other than the expected location; a fourth possible adverse condition, that the physical condition of the asset was compromised (too hot, too cold, too humid, subject to excessive shock, etc.); a fifth possible adverse condition, that the asset is no longer co-located with the one or more associated assets that were designated as being related to the asset (e.g., to be assembled together to form a cohesive unit); a sixth possible adverse condition, that the metadata associated with the asset changes, therefore producing a new adverse condition (e.g., a change in the delivery route that results in a delay); and so forth.

In at least one embodiment, process 600 comprises providing 622 contingent upon the generation of the determination that the at least one adverse condition occurred during the designated period to the asset, status information as a response to the status update request, wherein the status information omits at least a portion of the collected metrics. In at least one embodiment, a system performing at least part of process 600 determines whether one or more adverse conditions evaluate to be true and, if so, provides status information about the asset. Authorized user may determine the extent to which status information is provided. For example, the contents of the asset may not be provided until the asset nears delivery. The extent to which status information is provided may refer to a scope of temporary authorization for the unauthorized user, wherein the scope of temporary authorization comprises a time window over which status update requests may be provided. For example, the unauthorized user may be allowed to view status update information about the asset only for a specified period of time or until the asset is delivered, or until the asset is no longer subject to any applicable adverse conditions, or others. Status update information may be provided in a response to the status update request further contingent upon the status update request being received within the time window. In some embodiments, a scope of temporary authorization further comprises a restriction on delivery path information and the status information omits at least some of the geolocation metrics collected by the tracking device while the asset is in motion according to the restriction on the delivery path information.

In some embodiments, fulfillment of a status update request may be contingent upon one or more authentication factors. For example, a status update request for the status of an asset may only be valid if geolocation of the requestor indicates that the requestor is at the expected location. For example, the location of an unauthorized user submitting the status update request may be polled to determine whether the user is in an unauthorized country and deny the request if it is the case. In some embodiments, other unauthorized user limitations, such as not being on an authorized network, may be used to determine whether they fulfill the status update request.

In some embodiments, process 600 comprises scheduling, by the one or more processors of the device and based on the determination that the at least one adverse condition occurred during a designated time period to the first asset, the second asset replaces the first asset and cancels the first asset.

It is understood that the above descriptions are for purposes of illustration and are not meant to be limiting.

Figure 7:
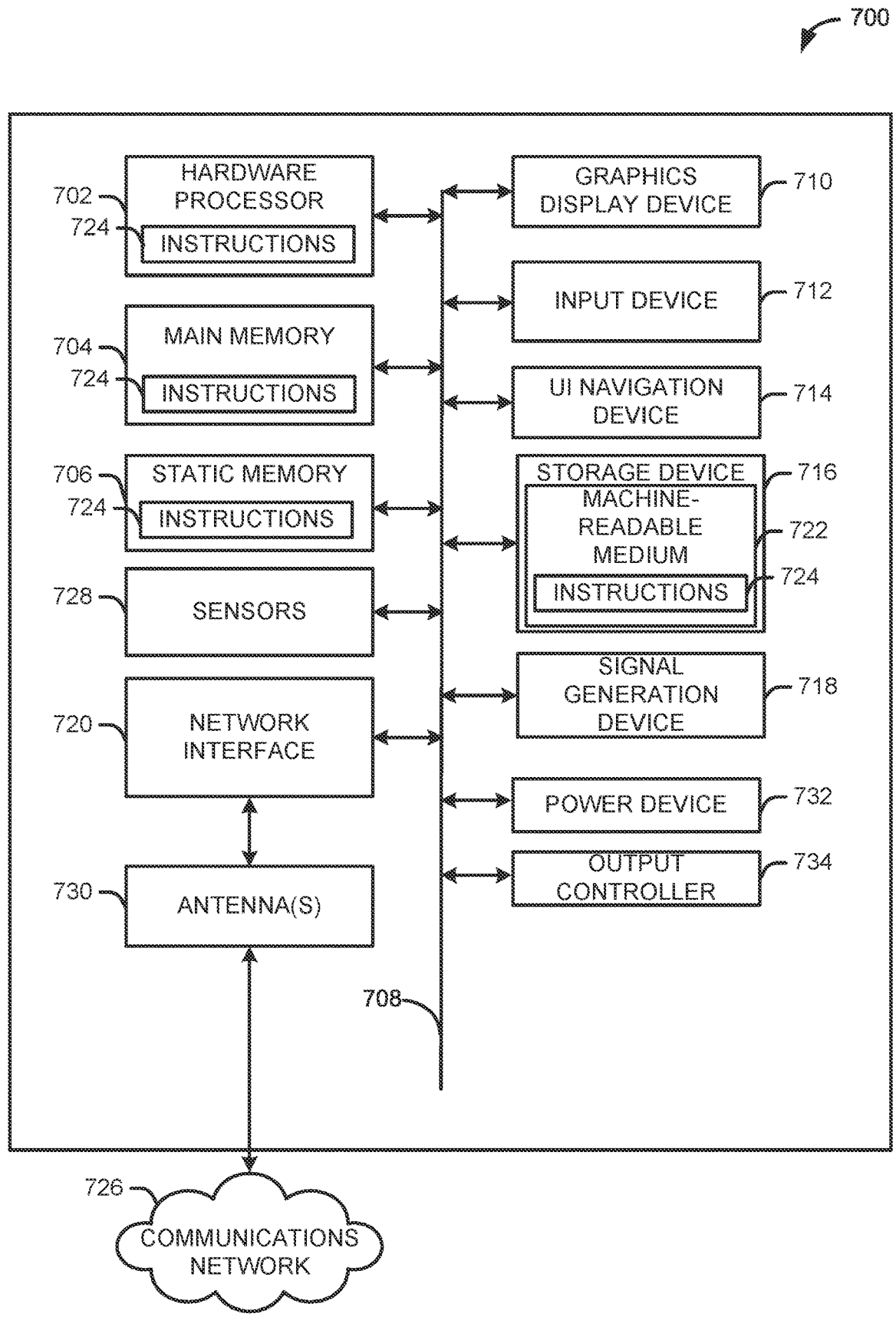
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a tensor processing unit (TPU) including an artificial intelligence application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a data signal), a network interface device/transceiver 720 coupled to antenna(s) 730, and one or more sensors 728, such as a sound detecting sensor (e.g., a microphone), accelerometers, magnetometers, location sensors, and the like. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), low power wide area network (LPWAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global navigation satellite system (GNSS) such as GPS, Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), LPWAN, LoRa, and all other low power networks, or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method, comprising:
   determining a set of expected parameters for an asset, wherein the set of expected parameters comprises:
     an expected location;
     an expected time;
     a description of contents of the asset;
     one or more additional assets associated with the asset;
     acceptable condition of the asset; and
     metadata associated with a route, status, or condition of the asset;
   storing, in a data store, the set of expected parameters in association with a unique identifier;
   generating an electronic status token that encodes the unique identifier, wherein the electronic status token is initialized in an invalid state, further wherein requests to access status information of the asset using the electronic status token in the invalid state are denied;
   providing the electronic status token to an unauthorized user, wherein the electronic status token is provided to the unauthorized user in the invalid state;
   providing provisioning information to a tracking device associated with the asset to cause the tracking device to begin collecting tracking information for the asset, wherein the tracking device comprises a GPS receiver;
   receiving, at a first time, a first status update request from the unauthorized user, the first status update request encoding the electronic status token;
   electronically receiving, from the tracking device, first metrics collected by the tracking device, the first metrics comprising a first current geolocation of the asset collected by the GPS receiver of the tracking device at/near the first time;
   determining, based at least in part on the first current geolocation, a first estimated delivery time;
   determining, based at least in part on the first estimated delivery time being earlier than the expected time, that the electronic status token is still in an invalid state;
   responsive to the determination of the first estimated delivery time being earlier than the expected time, automatically denying the first status update request;

receiving, at a second time after the first time, a second status update request from the unauthorized user, the second status update request also encoding the electronic status token;
electronically receiving, from the tracking device, second metrics collected by the tracking device, the second metrics comprising a second current geolocation of the asset collected by the GPS receiver of the tracking device at/near the second time;
determining, based at least in part on the second current geolocation, a second estimated delivery time;
responsive to the second estimated delivery time being later than the expected time, automatically determining that an adverse condition has occurred;
transitioning the electronic status token from the invalid state to a valid state; and
providing, in response to the electronic status token being in the valid state, the status information as a response to the second status update request, wherein the status information omits at least a portion of geolocation metrics collected by the GPS receiver prior to the determination of the adverse condition and includes additional geolocation metrics collected by the GPS receiver after the determination of the adverse condition.

2. The method of claim 1, further comprising:
determining a scope of temporary authorization for the unauthorized user, wherein the scope of temporary authorization comprises a time window over which status update requests may be provided; and
providing the status information as the response to the second status update request further contingent upon the second status update request being received within the time window.

3. The method of claim 2, wherein:
the scope of temporary authorization further comprises a restriction on path information; and
determining the status information by at least omitting at least some of the geolocation metrics collected by the tracking device while the asset is in transit according to the restriction on the path information.

4. The method of claim 1, further comprising:
determining, in response to the second status update request, geolocation information of the unauthorized user indicates that the unauthorized user is at or near the expected location; and
providing the status information contingent further upon determining that the unauthorized user is at or near the expected location.

5. The method of claim 1, wherein the status information includes status information for the one or more associated assets.

6. A system, comprising:
at least one processor; and
at least one memory storing computer-executable instructions, that when executed by the at least one processor, cause the at least one processor to:
determine a set of expected parameters for an asset, wherein the set of expected parameters comprises:
an expected location;
an expected time;
a description of contents of the asset;
one or more additional assets associated with the asset;
acceptable condition of the asset; and
metadata associated with a route, status, or condition of the asset;
store, in a data store, the set of expected parameters and an identifier;
generate an electronic status token that encodes the identifier, wherein the electronic status token is initialized in an invalid state, further wherein requests to access status information of the asset using the electronic status token in the invalid state are denied;
provide the electronic status token to an unauthorized user, wherein the electronic status token is provided to the unauthorized user in the invalid state;
provide provisioning information to a tracking device associated with the asset, wherein the tracking device comprises a GPS receiver;
receive, at a first time, a first status update request from the unauthorized user, the first status update request encoding the electronic status token;
receive, from the tracking device, first metrics collected by the tracking device according to the provisioning information, the first metrics comprising a first current geolocation of the asset collected by the GPS receiver of the tracking device at/near the first time;
determine, based at least in part on the first current geolocation, a first estimated delivery time;
determine, based at least in part on the first estimated delivery time being earlier than the expected time, that the electronic status token is still in an invalid state;
responsive to the determination of the first estimated delivery time being earlier than the expected time, automatically deny the first status update request;
receive, at a second time after the first time, a second status update request from the unauthorized user, the second status update request also encoding the electronic status token;
electronically receive, from the tracking device, second metrics collected by the tracking device, the second metrics comprising a second current geolocation of the asset collected by the GPS receiver of the tracking device at/near the second time;
determine, based at least in part on the second current geolocation, a second estimated delivery time;
responsive to the second estimated delivery time being later than the expected time, automatically determine that an adverse condition has occurred;
transition the electronic status token from the invalid state to a valid state; and
provide, in response to the electronic status token being in the valid state, the status information as a response to the second status update request, wherein the status information omits at least a portion of geolocation metrics collected by the tracking device.

7. The system of claim 6, wherein the computer-executable instructions, that when executed by the at least one processor, further cause the at least one processor to:
determine a scope of temporary authorization for the unauthorized user, wherein the scope of temporary authorization comprises a time window over which status update requests may be provided; and
provide the status information as the response to the second status update request further contingent upon the second status update request being received within the time window.

8. The system of claim 7, wherein:
the scope of temporary authorization further comprises a restriction on path information; and
wherein the computer-executable instructions, that when executed by the at least one processor, further cause the at least one processor to determine the status information by at least omitting at least some of the geolocation metrics collected by the tracking device according to the restriction on the path information.

9. The system of claim 6, wherein the computer-executable instructions, that when executed by the at least one processor, further cause the at least one processor to:
   determine, in response to the status update request, geolocation information of the unauthorized user indicates that the unauthorized user is at or near the expected location; and
   provide the status information contingent further upon determining that the unauthorized user is at or near the expected location.

10. The system of claim 6, wherein the asset is a first asset and the computer-executable instructions, that when executed by the at least one processor, further cause the at least one processor to:
    schedule, based on the determination that the condition occurred, delivery of a second asset replace the first asset; and
    cancel delivery of the first asset.

11. A non-transitory computer readable medium including computer-executable instructions stored thereon, which when executed by at least one processor, cause the at least one processor to:
    determine a set of expected parameters for an asset, wherein the set of expected parameters comprises:
      an expected location;
      an expected time;
      a description of contents of the asset;
      an expected condition of the asset;
      one or more associated assets; and
      metadata associated with a route, status, or condition of the asset;
    store, in a data store, a unique identifier in association with the set of expected parameters;
    generate an electronic status token that encodes the unique identifier, wherein the status token is initialized in an invalid state, further wherein requests to access status information of the asset using the status token in the invalid state are denied;
    provide the electronic status token to an unauthorized user, wherein the status token is provided to the unauthorized user in the invalid state;
    provide provisioning information to a tracking device associated with the asset, wherein the tracking device comprises a GPS receiver;
    receive, at a first time, a first status update request from the unauthorized user, the first status update request encoding the electronic status token;
    electronically receive, from the tracking device, first metrics collected by the tracking device according to the provisioning information, the first metrics comprising a first current geolocation of the asset collected by the GPS receiver of the tracking device at/near the first time;
    determine, based at least in part on the first current geolocation, a first estimated delivery time;
    determine, based at least in part on the first estimated delivery time being earlier than the expected time, that the electronic status token is still in an invalid state;
    responsive to the determination of the first estimated delivery time being earlier than the expected time, automatically deny the first status update request;
    receive, at a second time after the first time, a second status update request from the unauthorized user, the second status update request also encoding the electronic status token;
    electronically receive, from the tracking device, second metrics collected by the tracking device, the second metrics comprising a second current geolocation of the asset collected by the GPS receiver of the tracking device at/near the second time;
    determine, based at least in part on the second current geolocation, a second estimated delivery time;
    responsive to the second estimated delivery time being later than the expected time, automatically determine that an adverse condition has occurred;
    transition the electronic status token from the invalid state to a valid state; and
    provide, in response to the electronic status token being in the valid state, the status information as a response to the second status update request, wherein the status information omits at least a portion of geolocation metrics collected by the GPS receiver prior to the determination of the adverse condition and includes additional geolocation metrics collected by the GPS receiver after the determination of the adverse condition.

12. The non-transitory computer readable medium of claim 11, wherein the computer-executable instructions, that when executed by the at least one processor, further cause the at least one processor to:
    determine a scope of temporary authorization for the unauthorized user, wherein the scope of temporary authorization comprises a time window over which status update requests may be provided; and
    provide the status information as the response to the second status update request further contingent upon the second status update request being received within the time window.

13. The non-transitory computer readable medium of claim 12, wherein:
    the scope of temporary authorization further comprises a restriction on path information; and
    wherein the computer-executable instructions, that when executed by the at least one processor, further cause the at least one processor to determine the status information by at least omitting at least some of the geolocation metrics collected by the tracking device according to the restriction on the path information.

14. The non-transitory computer readable medium of claim 11, wherein the computer-executable instructions, that when executed by the at least one processor, further cause the at least one processor to:
    determine, in response to the status update request, geolocation information of the unauthorized user indicates that the unauthorized user is at or near the expected location; and
    provide the status information contingent further upon determining that the unauthorized user is at or near the expected location.

* * * * *